US012500008B2

(12) United States Patent
Haepers et al.

(10) Patent No.: US 12,500,008 B2
(45) Date of Patent: Dec. 16, 2025

(54) PIERCEABLE PLUG FOR NEEDLE

(71) Applicant: Lantheus Medical Imaging, Inc., North Billerica, MA (US)

(72) Inventors: Joseph Haepers, Acton, MA (US); Jack N. Wentz, Jr., Nashua, NH (US); Virginia Ann Hankard, Dunstable, MA (US); Khursida Shahidullah, Lexington, MA (US); Tricia D. Butland, Stoneham, MA (US); Patricia A. Corosa, Nashua, NH (US); David P. Rice, Derry, NH (US); Samantha Moran, Lowell, MA (US)

(73) Assignee: Lantheus Medical Imaging, Inc., Bedford, MA (US)

( * ) Notice: Subject to any disclaimer, the term of this patent is extended or adjusted under 35 U.S.C. 154(b) by 984 days.

(21) Appl. No.: 17/607,270

(22) PCT Filed: May 1, 2020

(86) PCT No.: PCT/US2020/031087

§ 371 (c)(1),
(2) Date: Oct. 28, 2021

(87) PCT Pub. No.: WO2020/227120

PCT Pub. Date: Nov. 12, 2020

(65) Prior Publication Data

US 2022/0189651 A1 Jun. 16, 2022

Related U.S. Application Data

(60) Provisional application No. 62/843,090, filed on May 3, 2019.

(51) Int. Cl.
*G21G 4/08* (2006.01)

(52) U.S. Cl.
CPC .................................... *G21G 4/08* (2013.01)

(58) Field of Classification Search
None
See application file for complete search history.

(56) References Cited

U.S. PATENT DOCUMENTS 3,476,998 A 11/1969 Agarwal
3,774,035 A 11/1973 Litt
(Continued)

FOREIGN PATENT DOCUMENTS

EP 2548597 B1 8/2016
GB 2114006 A 8/1983
(Continued)

OTHER PUBLICATIONS

International Search Report and Written Opinion for International Application No. PCT/US2020/031087 mailed Aug. 6, 2020.
(Continued)

*Primary Examiner* — Robert H Kim
*Assistant Examiner* — Alina Kaliszewski
(74) *Attorney, Agent, or Firm* — Wolf, Greenfield & Sacks, P.C.

(57) ABSTRACT

A pierceable plug for closing off a piercing end of a needle is described herein. The plug has an end that is configured to be pierced by the needle to close off the piercing end of the needle. The plug may be radiation sterilizable and may be made of a material that includes an antimicrobial agent. The plug may be used to close off a needle end that is in fluid communication with a radioactive substance.

13 Claims, 5 Drawing Sheets

(56) References Cited

U.S. PATENT DOCUMENTS

| | | | | |
|---|---|---|---|---|
| 4,280,053 | A | 7/1981 | Evans et al. | |
| 4,482,348 | A * | 11/1984 | Dent | A61M 5/326 604/263 |
| 4,921,491 | A * | 5/1990 | Champ | A61M 5/3243 604/199 |
| 5,109,160 | A * | 4/1992 | Evers | G21G 4/08 250/432 PD |
| 5,230,428 | A * | 7/1993 | McShane | A61M 5/3213 206/363 |
| 6,648,857 | B1 * | 11/2003 | Pedigo | A61M 5/3213 604/263 |
| 8,822,950 | B2 | 9/2014 | Evers | |
| 9,896,791 | B2 | 2/2018 | Yamauchi et al. | |
| 9,901,296 | B2 | 2/2018 | Fritz et al. | |
| 10,524,708 | B2 | 1/2020 | Shi | |
| 2005/0075611 | A1 | 4/2005 | Hetzler et al. | |
| 2007/0217959 | A1 * | 9/2007 | Balestracci | F16L 37/2445 422/50 |
| 2018/0250194 | A1 | 9/2018 | Drmanovic | |
| 2018/0353706 | A1 * | 12/2018 | Hetting | A61M 5/3243 |
| 2020/0197623 | A1 * | 6/2020 | McLusky | A61M 5/3213 |

FOREIGN PATENT DOCUMENTS

| | | | |
|---|---|---|---|
| RU | 2609055 | C1 | 1/2017 |
| WO | WO 00/78214 | A1 | 12/2000 |
| WO | WO 01/66010 | A1 | 9/2001 |

OTHER PUBLICATIONS

International Preliminary Report on Patentability (Chapter 1) for International Application No. PCT/US2020/031087 mailed Nov. 18, 2021.

* cited by examiner

PIERCEABLE PLUG FOR NEEDLE

CROSS-REFERENCE TO RELATED APPLICATIONS

This application is a national stage filing under 35 U.S.C. § 371 of international PCT application PCT/US2020/031087, filed May 1, 2020, which claims the benefit under 35 U.S.C. § 119(e) of U.S. Provisional Application Ser. No. 62/843,090, filed May 3, 2019, entitled "PIERCEABLE PLUG FOR NEEDLE", the entire contents of each of which are incorporated by reference herein.

BACKGROUND

1. Field

Aspects of the present invention relate to a pierceable plug configured to be pierced by a needle to close off a piercing end of the needle.

2. Discussion of Related Art

Needles, both solid and hollow, may be used for a variety of purposes. Hollow needles, for instance, may be used as an inlet and/or outlet that is in fluid communication with a container holding a substance. Needles may be used to pierce objects, inject fluids into a location, withdraw fluids from a location, and so on.

Needles may be used, for example, as part of a radionuclide generator. Radionuclide generators include a column that has media for retaining a long-lived parent radionuclide that spontaneously decays into a daughter radionuclide that has a relatively short-lived life. The column may be incorporated into a column assembly that has a hollow needle outlet port that receives an evacuated vial to draw saline or other eluant liquid, provided to a hollow needle inlet port, through a flow path of the column assembly, including the column itself. This liquid may elute and deliver daughter radionuclide from the column and to the evacuated vial for subsequent use in nuclear medical imaging applications, among other uses. One example of a generator is shown and described in U.S. Pat. No. 5,109,160, owned by Lantheus Medical Imaging, Inc., and which is incorporated by reference herein in its entirety.

SUMMARY

According to one aspect, a plug configured to be pierced by a needle is provided. The plug includes a handle at a first end of the plug and a curved surface at a second end of the plug, the curved surface being configured to be pierced by the needle. The plug also includes a side surface positioned between the first end and the second end of the plug.

According to another aspect, a method of closing off a piercing end of a needle is provided. The method includes providing a plug having a handle and an end configured to be pierced by a needle, grasping the handle of a plug and moving the end of the plug toward a piercing end of a needle, and pushing the plug onto the piercing end of the needle such that the needle pierces into the end of the plug.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
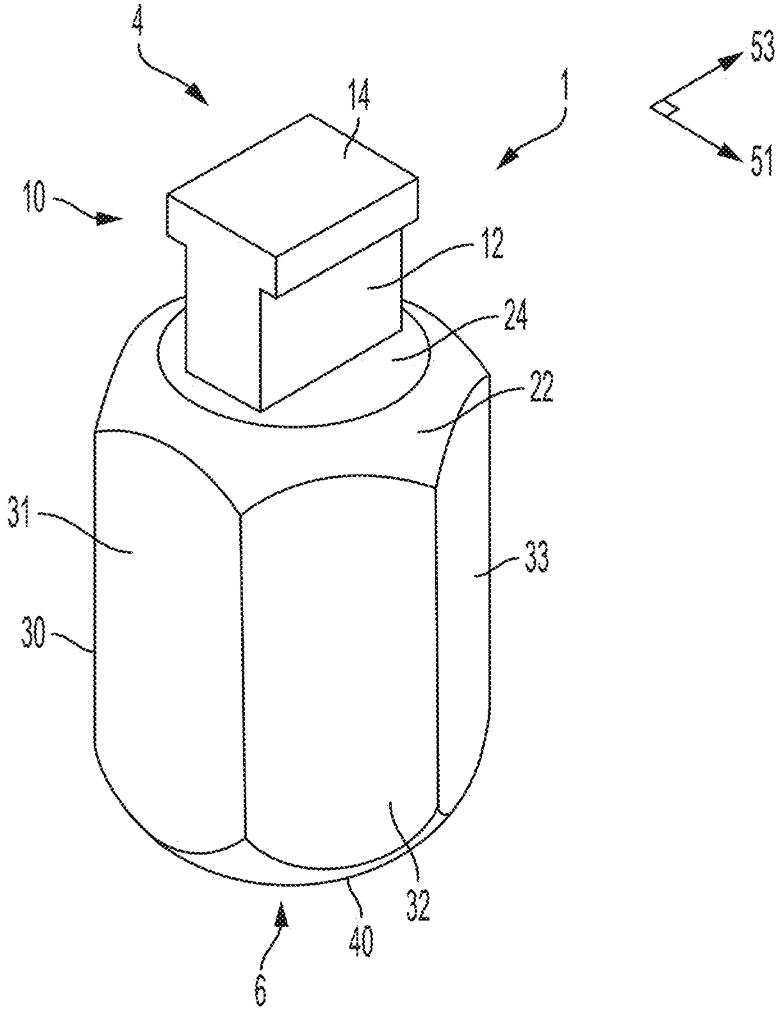
FIG. 1 is a perspective view of one embodiment of a pierceable plug.

The inventors have recognized a need to close off a piercing end of a needle in a simple to use manner. The inventors have appreciated that closing off a piercing end of a needle may help to protect the needle from damage and/or contamination, may help to protect users and other objects from being accidentally pierced by the needle and/or from being exposed to substances on the needle, or any combination of the above.

Aspects herein are directed to a pierceable plug and methods of using the plug for closing off a piercing end of a needle. In some embodiments, the plug and needle may be used for radiopharmaceutical applications. For example, the needle may be a port on a radionuclide generator, and the plug may be used to close off and open the port as needed during elution of a radionuclide. Some aspects described herein relate to structural features on the plug that may help to avoid contamination of the needle, any substances or objects that are in fluid communication with the needle, and/or any support surface that the plug may be rested upon when the plug is removed from the needle. Some aspects described herein relate to creating the plug out of a material that may help prevent potential contamination of the plug, needle, and any substances or objects that are in fluid communication with the needle.

According to one aspect, the plug is a solid piece of material that is configured to be pierced by the piercing end of the needle. With the needle pierced into the plug, the piercing end of the needle may be fully embedded inside the plug. In some embodiments, having the piercing end of the needle fully embedded inside the plug may help to protect the piercing end of the needle from being dented, bent, or otherwise damaged, may help to protect users and other objects from being pierced by the piercing end of the needle, may help to protect users and other objects from being exposed to substances on and/or inside the needle (e.g. if the needle is hollow), may help to prevent potential contamination of the needle between elutions when the needle is exposed, which may, in some embodiments, prevent microbial contamination of fluid that is in fluid communication with the needle, or any combination of the above.

According to one aspect, the plug may be made of a material that is suitable to be pierced by a needle without causing damage to the needle. In some embodiments, the needle may be pierced into the plug and removed without leaving a hole that would prevent re-use of the plug. Instead, the plug may be repeatedly pierced without losing the ability to receive and retain subsequent needles. In some embodiments, the plug is made of silicone, rubber, elastic, or other elastomeric material.

According to one aspect, the plug is sized to be a standalone component that is configured to be moved toward a needle and removed from the needle during use. In some embodiments, the plug has a handle that is configured to be grasped by a user to move the plug toward a needle. The plug may have a first end where the handle is situated, and may have an opposite, second end that is configured to be pierced by the needle. In some embodiments, the plug is integrally formed as one monolithic component. As such, the handle of the plug and the end of the plug that is configured to be pierced may be made from the same material and may be one monolithic component.

As used herein, parts that are "integrally formed" with one another means that the parts are formed as one component such that they are formed from a single monolithic component, e.g., cast at the same time as a single piece such as in injection molding, or cut from a single material such as in stamping or die cutting.

In some embodiments, rather than being integrally formed, the plug is made of two or more formed pieces that are first separately formed, and then attached together.

The plug may be manufactured using molding (including, but not limited to, injection molding, transfer molding and compression molding), extrusion, latex dipping, or any other suitable process.

Figure 2:
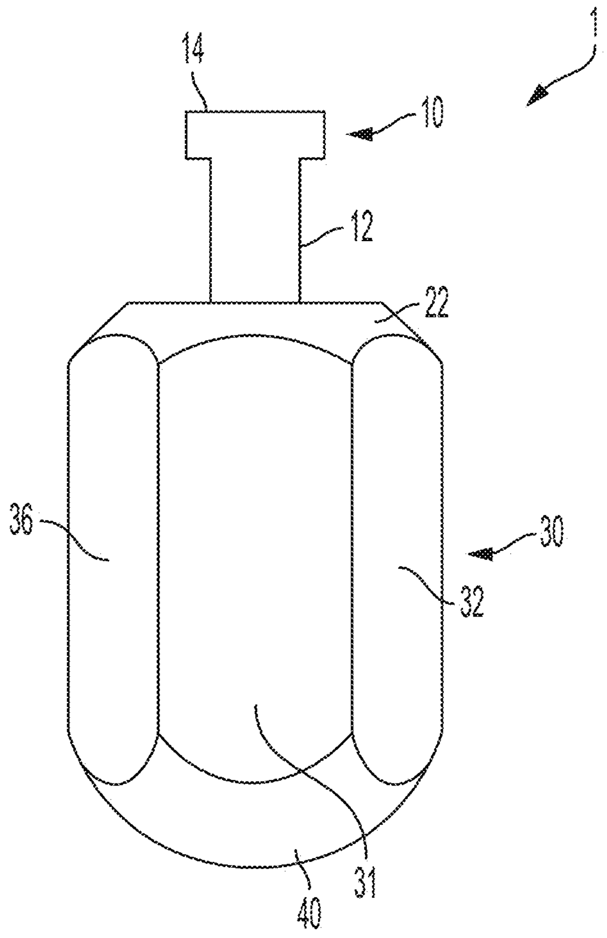
FIG. 2 is a side view of the plug of FIG. 1.

Turning to the figures, FIG. 1 depicts an illustrative embodiment of a plug 1, and FIG. 2 depicts a side view of the plug 1. The plug has a first end 4 and a second end 6. A handle 10 is at the first end 4, and a surface configured to be pierced 40 is at the second end 6.

In some embodiments, the plug necks inwardly transitioning from the side of the plug to the handle of the plug. In some embodiments, the plug has a handle that includes a neck portion and an overhang portion, where the overhang portion extends beyond a side surface of the neck portion. In some embodiments, the neck portion and the overhang portion form a T-shape. In some embodiments, the overhang portion extends beyond the neck portion in a first direction and is flush along a plane with the neck portion in a second direction perpendicular to the first direction. In some embodiments, a flat face of the side surface of the plug is parallel with the plane along which the overhang portion is flush with the neck portion.

In the illustrative embodiment shown in FIGS. 1 and 2, the plug necks inwardly transitioning from the side 30 of the plug to the handle 10 of the plug. The handle 10 includes a neck portion 12 and an overhang portion 14. The overhang portion 14 extends beyond the neck portion 12 along a first direction 51 and is flush with the neck portion 12 along a second direction 53, where the first and second directions are perpendicular to one another. As seen in FIG. 1, the plane along which the overhang portion 14 is flush with the neck portion 12 is parallel with the flat face 31 of the side 30 of the plug. As seen in FIG. 2, the overhang portion 14 and the neck portion 12 form a T-shape.

In the illustrative embodiment of the plug shown in FIG. 1, the plug includes first and second transition portions 22 and 24 that transition the plug from the plug side to the plug handle. The first transition portion 22 is a rounded shoulder that serves to transition the plug from a hexagonal shape to the circular shape of second transition portion 24. The first transition portion 22 may also be seen from the side view in FIG. 2, and the second transition portion 24 may also be seen from the top view in FIG. 3.

According to one aspect, the end that is configured to be pierced by the needle is a curved surface. When the plug is removed from the needle, a user may want to place the plug down on a support surface, such as a table top or lab bench. A curved surface on the pierced end of the plug may discourage a user from resting the pierced end of the plug down on the support surface, e.g. because a curved surface may be unstable and may cause the plug to roll around and/or fall over. The user may then seek to rest a different portion of the plug on the support surface.

Figure 4A:
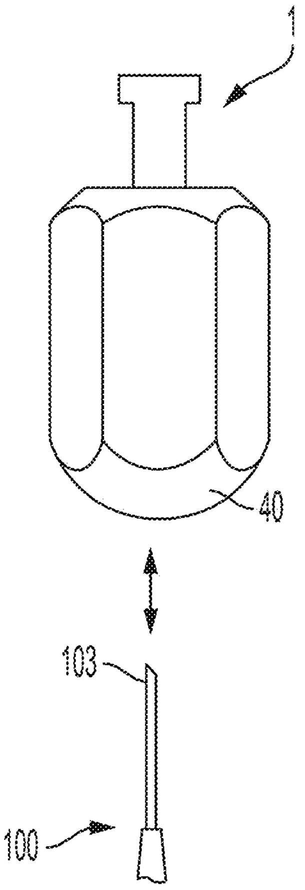
FIG. 4A depicts the plug of FIG. 1 being moved toward a needle.
Figure 4B:
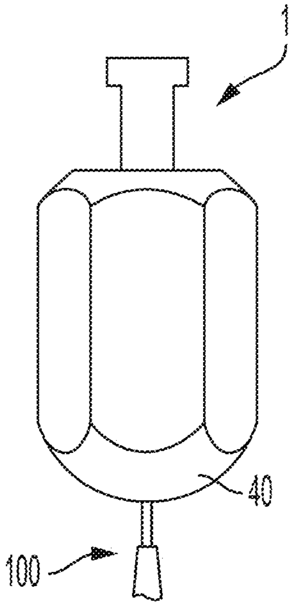
FIG. 4B depicts the plug of FIG. 4B being pierced with the needle.

In the illustrative embodiment shown in FIGS. 1 and 2, the surface configured to be pierced 40 is a curved (convex) surface. FIGS. 4A and 4B depict the plug being used to close off a piercing end of a needle. As shown in FIG. 4A, the plug 1 is moved toward a piercing end 103 of a needle 100, with the rounded end 40 of the plug facing the piercing end 103 of the needle 100. As shown in FIG. 4B, the plug 1 has been pushed onto the needle 100 such that the piercing end of the needle pierces into the rounded end 40 of the plug, thus closing off the piercing end of the needle.

In some embodiments, the side of the plug is provided with a flat surface. In some embodiments, the flat surface may help to prevent the plug from rolling off a support surface when the plug is rested on its side on the support surface. Thus, rather than rest the rounded, pierced end of the plug on the support surface or a rounded side which may give rise to rolling, the user may instead rest the flat surface of the side of the plug onto the support surface. Alternatively or in addition, the user may rest the handle end of the plug on the support surface, e.g. using a flat surface on the handle end.

There may be different reasons to deliberately shape the pierced end of the plug to have a curved surface. In some embodiments, one reason may be to avoid contamination of the needle end. The portion of the plug that is rested against a support surface when the plug is removed from the needle may become contaminated due to contact with the support surface. Piercing a needle into a contaminated surface of the plug may then cause the needle to become contaminated as well. Furthermore, if the needle is in fluid communication with a container and/or any other substances, the container and/or substances may become contaminated also. Thus, the rounded shape of the pierced end of the plug may encourage the user to seek to rest a different portion of the plug on a support surface, such as a side surface or an end of the plug opposite to the pierced end.

In some embodiments, another reason for a rounded pierced end of the plug may be to prevent substances from the needle that have been transferred onto the plug to be further transferred to a support surface on which the plug rests when the plug has been removed from the needle. This reason may be particularly relevant, if, for example, the substances that have been transferred from the needle to the plug are hazardous, such as toxic or radioactive substances. Such a feature may help to prevent contamination of the support surface with material from the needle, e.g. preventing radioactive contamination or spread.

In some embodiments, another reason for a rounded pierced end of the plug may be to avoid damaging the end of the plug that is configured to be pierced by discouraging a user from contacting the rounded end of the plug with a support surface.

It should be appreciated that any combination of the above reasons may apply, and in some embodiments, there may be a different reason to have a rounded pierced end of the plug.

In some embodiments, the side of the plug may comprise a plurality of flat side surfaces. Together, the side surfaces may form different shapes, such as a triangle, square, rectangle, pentagon hexagon, octagon, or any other suitable shape. Adjacent side surfaces may be at an angle relative to one another, such as a right angle or an oblique angle. For example, in the case of the side surfaces forming a square or rectangle, adjacent side surfaces are at right angles relative to one another. As another example, in the case of the side surfaces forming a hexagon, adjacent side surfaces are at oblique angles relative to one another. In other embodiments, the side of the plug may be a curved surface, e.g. to form a circular or elliptical shape.

Figure 3:
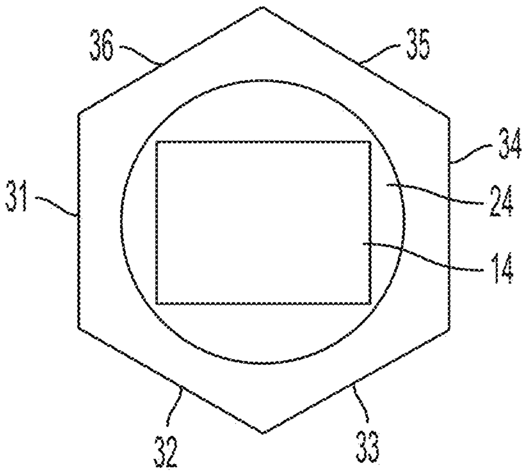
FIG. 3 is a top view of the plug of FIG. 1.

In the illustrative embodiment shown in FIGS. 1-3, the side 30 of the plug is made up of a plurality of flat surfaces 31, 32 and 33, along with three other flat side surfaces that cannot be seen from FIG. 1. The six flat surfaces are best seen in the top view of FIG. 3, which shows the side surfaces 31, 32, 33, 34, 35, and 36. The six side surfaces form a hexagon shape, where adjacent side surfaces are at an oblique angle relative to one another.

In some embodiments, the plug may be exposed to radiation and/or may come into contact with radioactive material. For example, in some embodiments, the plug may undergo radiation sterilization processes such as gamma irradiation sterilization. As another example, in some embodiments, the plug may come into contact with radioactive substances during use. In some embodiments, the plug may be used with a needle that is associated with radioactive materials. For example, the needle may be in fluid communication with or otherwise connected to a container holding radioactive material, e.g. in liquid form. The portion of the needle that is pierced into the plug may, at times, be at least partially covered with radioactive material when piercing into the plug, thus exposing the plug to radioactive material.

The inventors have appreciated that radiation and contact with radioactive material can cause the mechanical properties of a material to degrade. For example, a material exposed to radiation and/or placed in contact with radioactive material can experience decreased tensile strength, decreased elongation at break, increased compression set, and/or decreased elasticity.

As such, according to one aspect, the plug may be made of a radiation sterilizable material. In some embodiments, the plug is made of a silicone material. However, other materials are possible, such as ethylene propylene diene monomer (EPDM) rubber, or other elastomers such as 4588/40 isoprene/chlorobutyl, 6720 bromobutyl and 140/0 chlorobutyl.

In some embodiments, the needle may be part of a radionuclide generator, such as, for example, a technetium generator. Other possible radionuclide generators include, but are not limited to: Ga-68 generators, Kr-91m generators, Rb-82 generators, and In-113m generators. A plug as described above may be used to close a piercing end of one or more input or output needles of a radionuclide generator. Details regarding radionuclide generators are discussed in U.S. Pat. No. 8,822,950, which is hereby incorporated by reference in its entirety.

Figure 5:
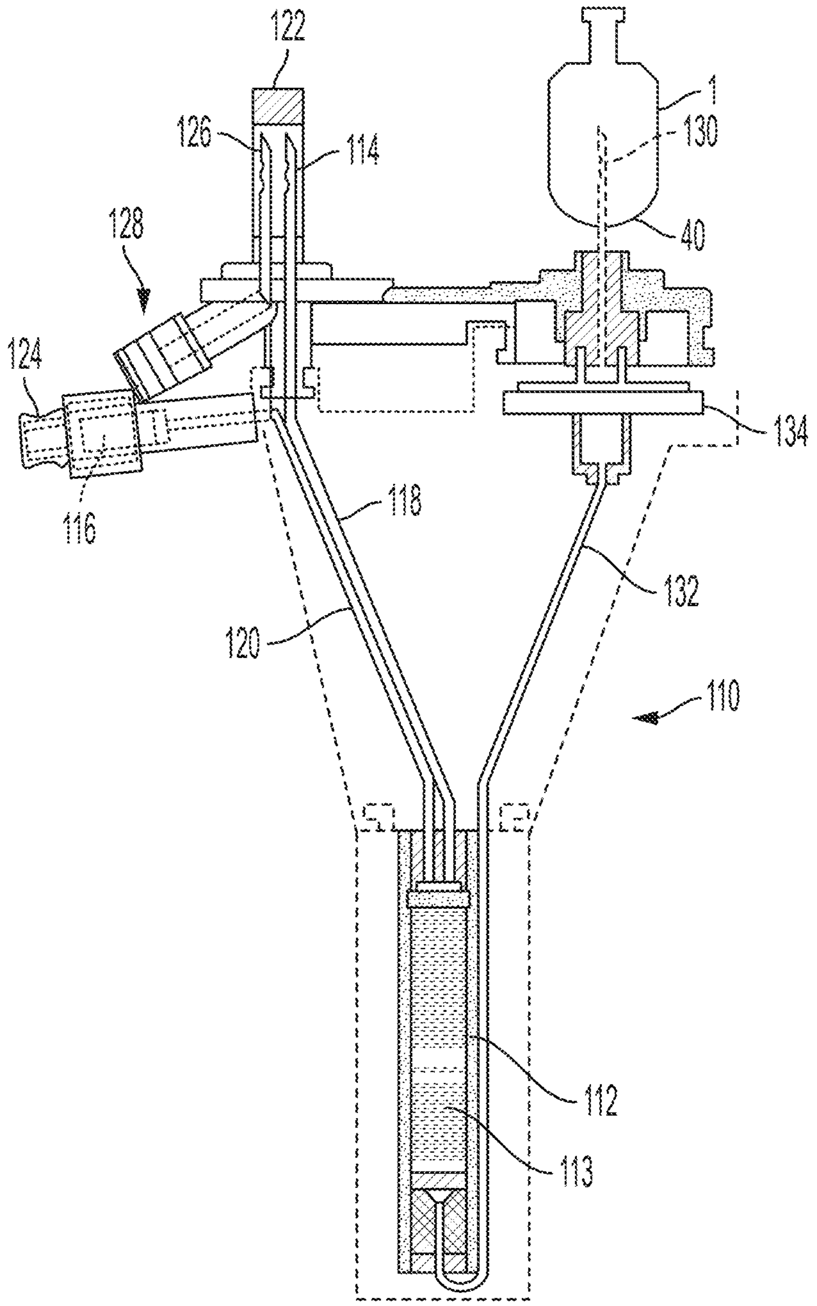
FIG. 5 depicts the plug of FIG. 1 being used with an output needle of a radionuclide generator.

In FIG. 5, one embodiment of a column assembly 110 of a radionuclide generator is shown. The column assembly 110 includes a column 112 having a media 113, the column 112 being fluidly connected at one end to a saline charge inlet port needle 114 and a loading site 116 through an inlet line 118 and a charge line 120, respectively. As shown, the inlet port needle 114 is covered with a cover 122, and the loading site 116 is covered with a cover 124. A vent port 126 that communicates fluidly with an eluant vent 128 is positioned adjacent to the inlet port needle 114, and may, in operation, provide a vent to a vial or bottle of eluant connected to the inlet port.

The column assembly 110 also includes an outlet port needle 130 that is fluidly connected to the column 112 through an outlet line 132. In some embodiments, the outlet port needle 130 is fluidly connected to the bottom of the column 112. A filter assembly 134 is incorporated into the outlet line, and the outlet port needle 130 is covered with a plug 1.

In some embodiments, to use the generator, the user may remove the cover 122 and place a saline vial on the inlet port needle 114. The user may also place an evacuated collection vial on the outlet port needle 130 and vent port 126. Eluate flows from the inlet line 118 through the media 113 inside the column 112 and out through the outlet port needle 130. The user then removes the collection vial from the outlet port needle 130 and replaces the vial with a pierceable plug 1. In some embodiments, the plug may be made of a material that includes antimicrobial agents. The sterile empty saline vial may be left on the inlet port needle 114 and vent port 126 as a cover. In some embodiments, the original cover 122 is disposed.

In some embodiments, the cover at the inlet port needle may be a pierceable plug in accordance with any of the embodiments described herein. As such, the pierceable plugs described herein are not limited for use with an outlet port needle of a radionuclide generator, as the plugs described herein may also, or alternatively, be used at an inlet port needle of a radionuclide generator. In some embodiments, if pierceable plugs are used at both the inlet port needle and the outlet port needle, each needle may have its own designated pierceable plug.

In some embodiments, the radionuclide generator is a technetium generator.

Various aspects of the illustrated embodiment of the column assembly are described in greater detail in U.S. Pat. No. 5,109,610 (Evers), owned by Lantheus Medical Imaging, Inc, which is hereby incorporated by reference in its entirety. Additionally, column construction materials and operation are described in U.S. Pat. No. 3,774,035 (Litt), which is also hereby incorporated by reference in its entirety.

According to one aspect, the plug is configured to aid in preventing microbial contamination of the plug, the needle and/or substances that the needle is in fluid communication with. In some embodiments, the needle is in fluid communication with a radioisotope that may be used to form a radiopharmaceutical for injection into the human body. For example, where the needle is a port on a radionuclide generator, the inventors have appreciated that the plug may be designed to promote cleanliness of the needle and thus prevent contamination of the contents within the generator or of the eluted radioisotope solution.

In some embodiments, the material of the plug may contain an antimicrobial agent. In some embodiments, the antimicrobial agent is a silver-based antimicrobial agent such as ALPHASAN (Milliken and Co., Spartanburg, SC), which is a zirconium phosphate-based silver ion-containing ion exchange resin. In some embodiments, the material of the plug is STATSIL (Momentive Performance Materials Inc., Albany, NY), which is a silicone elastomer with an incorporated silver-based antimicrobial additive.

Other antimicrobial agents may be used as well, such as a quaternary siloxane antimicrobial agent, silicon-based antimicrobial agents (e.g. BIOSAFE from Gelest, Inc., Morrisville, PA), soluble glass particles that contain silver ions (e.g. IONPURE IPL<10μ and IONPURE IPL<40μ from Ishizuka Glass Co., Naguya, Japan), polycarbonate polyol (e.g. PC-1122 from Stahl U.S.A., Peabody, MA), dicyclohexylmethane diisocyanate (e.g. DESMODUR W from Bayer Material Science LLC, Pittsburgh PA), stannous octoate (e.g. T-9 or DABCO T-9 from Air Products and Chemicals Inc., Allentown, PA), bismuth carboxylate (e.g. K-KAT 348 from King Industries, Inc., Norwalk CT), antioxidant (e.g. TINUVIN 765 from Ciba Specialty Chemicals, Tarrytown NY), Vitamin E (e.g. IRGANOX E-201 from Ciba Specialty Chemicals, Tarrytown NY), tris(nonylphenyl)phosphite (e.g. TNPP), lubricant wax (e.g. GLYCOLUBE LV from Lonza Inc., Allendale NJ), fumed silica (e.g. CAB-O-SIL TS-720 from Cabot Corp., Alpharetta, GA), or micronized silica (e.g. SYLYSIA 320 and SYLYSIA 340 from Fuji Silysia Chemical Ltd., Aichi Japan).

The antimicrobial agent may be radiation resistant such that the antimicrobial agent maintains antimicrobial efficacy when subjected to certain levels of radiation. In some embodiments, the antimicrobial agent is resistant to gamma radiation such that, when subjected to gamma radiation levels of 25 kGy to 50 kGy, the material maintains an antimicrobial efficacy of greater than 3 log reduction of test organisms (e.g. *Staphyloccocus aureus*, ATCC 6538 and *Eschericia coli* ATCC 8739 and ATCC 25922), as measured by one or more standard tests, including: the Standard Test Method for Determining the Antimicrobial Activity of Immobilized Antimicrobial Agents (ASTM E2149) and the Japanese Industrial Standard (JIS) Z2801Test for Determining Antimicrobial Activity (also referred to as the ISO 22196 standard). As an illustrative example, the zirconium phosphate-based silver ion-containing ion exchange resin antimicrobial agent ALPHASAN (Milliken and Co., Spartanburg, SC) may exhibit such radiation resistance to gamma radiation.

In some embodiments, when subjected to gamma radiation levels of 25 kGy to 50 kGy, the antimicrobial agent maintains an antimicrobial efficacy of between a 3 to 5 log reduction, between a 4 to 5 log reduction, and between a 4 to 4.5 log reduction of test organisms as measured by ASTM E2149 and/or JIS Z2801 (ISO 22196).

In some embodiments, the antimicrobial agent may be temperature resistant such that the antimicrobial agent maintains antimicrobial efficacy when subjected to certain temperatures. In some embodiments, the antimicrobial agent is resistant to temperature such that, when subjected to a temperature of 350 degrees Fahrenheit for 3 minutes, the antimicrobial agent maintains an antimicrobial efficacy of greater than 3 log reduction of test organisms (e.g. *Staphyloccocus aureus*, ATCC 6538 and *Eschericia coli* ATCC 8739 and ATCC 25922), as measured by one or more standard tests, including: the Standard Test Method for Determining the Antimicrobial Activity of Immobilized Antimicrobial Agents (ASTM E2149) and the Japanese Industrial Standard (JIS) Z2801 Test for Determining Antimicrobial Activity (also referred to as the ISO 22196 standard). As an illustrative example, the zirconium phosphate-based silver ion-containing ion exchange resin antimicrobial agent ALPHASAN (Milliken and Co., Spartanburg, SC) may exhibit such temperature resistance.

In some embodiments, when subjected to a temperature of 350 degrees Fahrenheit for 3 minutes, the antimicrobial agent maintains an antimicrobial efficacy of between a 3 to 5 log reduction, between a 4 to 5 log reduction, and between a 4 to 4.5 log reduction of test organisms as measured by ASTM E2149 and/or JIS Z2801 (ISO 22196).

EXAMPLES

Example 1

A pierceable plug was molded into the geometry shown in FIGS. 1-3 as a one-piece, integrally formed component. The plug was made of STATSIL (Momentive Performance Materials Inc., Albany, NY). The plug was used to cover an outlet port needle of a technetium generator by piercing the outlet port needle into the rounded end (see rounded end 40 in FIG. 4A) of the plug.

Example 2

A pierceable plug was molded into the geometry shown in FIGS. 1-3 as a one-piece, integrally formed component. The plug was made of a material having the antimicrobial additive ALPHASAN (Milliken and Co., Spartanburg, SC). The plug was used to cover an outlet port needle of a technetium generator by piercing the outlet port needle into the rounded end (see rounded end 40 in FIG. 4A) of the plug.

The foregoing written specification is considered to be sufficient to enable one skilled in the art to practice the invention. The present invention is not to be limited in scope by examples provided, since the examples are intended as a single illustration of one aspect of the invention and other functionally equivalent embodiments are within the scope of the invention. Various modifications of the invention in addition to those shown and described herein will become apparent to those skilled in the art from the foregoing description and fall within the scope of the invention. The advantages and objects of the invention are not necessarily encompassed by each embodiment of the invention.

EQUIVALENTS

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

All references, patents and patent applications disclosed herein are incorporated by reference with respect to the subject matter for which each is cited, which in some cases may encompass the entirety of the document.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A plug configured to be pierced by a needle of a radionuclide generator, comprising:
- a handle at a first end of the plug;
- a curved surface at a second end of the plug, the curved surface being configured to be pierced by the needle of the radionuclide generator; and
- a side surface positioned between the first end and the second end of the plug.

2. The plug of claim 1, wherein the side surface comprises a plurality of flat faces.

3. The plug of claim 2, wherein two adjacent faces of the plurality of flat faces are positioned at an oblique angle relative to one another.

4. The plug of claim 2, wherein the plurality of flat faces forms a hexagon.

5. The plug of claim 1, wherein the side surface is curved.

6. The plug of claim 1, wherein the plug necks inwardly transitioning from the side surface to the handle.

7. The plug of claim 1, wherein the handle includes a neck portion and an overhang portion that extends beyond the neck portion, the neck portion and the overhang portion forming a T-shape.

8. The plug of claim 7, wherein the overhang portion extends beyond the neck portion in a first direction and is flush along a plane with the neck portion in a second direction perpendicular to the first direction.

9. The plug of claim 8, wherein the side surface includes a flat face that is parallel with the plane.

10. The plug of claim 1, wherein the plug is made of a radiation sterilizable material.

11. The plug of claim 1, wherein the plug is made of silicone.

12. The plug of claim 1, wherein the plug is made of ethylene propylene diene monomer.

13. The plug of claim 1, wherein the plug is made of a material that contains an antimicrobial agent.

* * * * *